April 1, 1952 W. H. MAYNE 2,591,177
SEISMIC SURVEYING
Filed Dec. 2, 1949
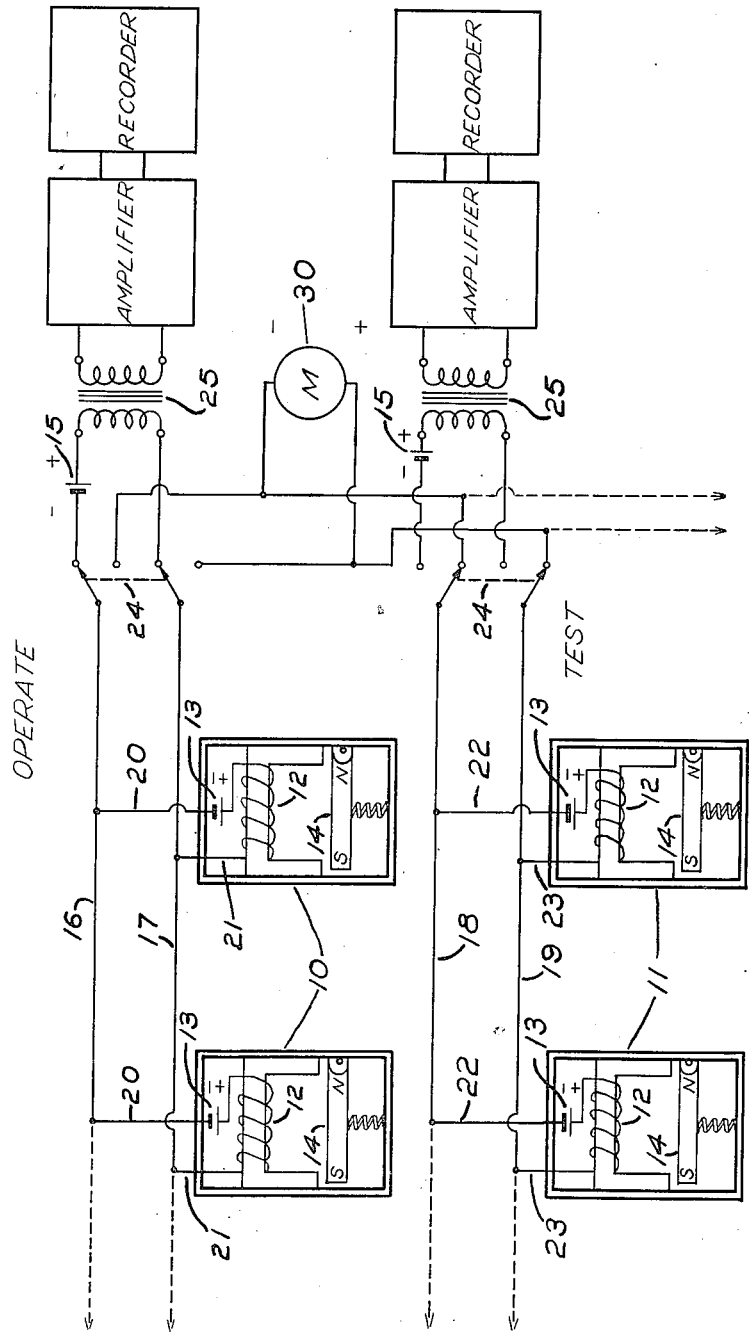
INVENTOR
William Harry Mayne
BY Watson, Cole, Grindle & Watson
ATTORNEYS Patented Apr. 1, 1952

2,591,177

UNITED STATES PATENT OFFICE 2,591,177

SEISMIC SURVEYING

William Harry Mayne, San Antonio, Tex., assignor to Olive S. Petty, San Antonio, Tex.

Application December 2, 1949, Serial No. 130,802

2 Claims. (Cl. 177—352)

This invention relates to measuring apparatus, and is especially concerned with apparatus for use in seismic surveying.

In conducting geological surveys by the seismic method, seismic waves are propagated in the earth, for example by detonating a charge of explosive at a selected point, called the shot point. Seismometers or detectors, responsive to the vibrations so propagated, and capable of converting the energy of vibration into electrical wave form signal energy, are located at some distance from the shot point on or just beneath the surface. A plurality of seismometers is ordinarily employed, suitably spaced so that the refracted or reflected wave energy arrives at the several detecting points at different times, and the output of each seismometer, or of each group of seismometers, is transmitted by means of a conducting line to a remote station at which the signal energy is suitably amplified and recorded, the connections to the conducting line being made when the detecting instrument is positioned.

It is important that each seismometer be so connected to its conducting line or transmission that the earth vibrations from the several detecting points will be received at the remote station in the correct phase, and it is necessary that the operator at the recording station be informed in the event any seismometer is improperly connected to the conducting line, either by reason of reversal of the output leads of the seismometer, or by failure to make proper contact between these leads and the conducting line. It is the principal object of the present invention to provide means whereby such improper connections may be determined at the recording station.

More specifically, the present invention contemplates the association with the output circuit of each seismometer of a source of low D. C. voltage, and with the input circuit at the amplifying and recording station of a second and similar voltage source, arranged to oppose the first voltage source, whereby the effect of the first voltage source during the recording of energy is nullified. A switch or the equivalent, operable at the recording station, enables the operator to connect the conducting line either to the input circuit or to a polarity indicating device, for instance a D. C. meter, thereby eliminating the second voltage source and permitting a reading of the polarity of the first voltage source and magnitude of current flow in the circuit. A reversal or other faulty connection of any seismometer with its associated conducting line may thus be readily determined and corrected before a record is made, and inaccurate records resulting from such improper connection avoided.

Further objects and features of the invention will be apparent from the following description taken in connection with the accompanying drawing, showing a wiring diagram of seismic surveying apparaus to which the invention has been applied.

In order to facilitate an understanding of the invention, one embodiment thereof is illustrated, and specific language is employed to describe the same. It will nevertheless be understood that no limitation of the invention is thereby intended, such alterations and further modifications being contemplated as would normally occur to one skilled in the art to which the invention relates.

Referring now to the drawing, it will be observed that two groups of seismometers, 10 and 11, are illustrated, the seismometers of each group being connected to the same conducting line. Each of the seismometers is represented diagrammatically as of the magnetic type, having an output winding 12. Wave form electrical energy, representative of the vibratory displacement to which the seismometer is subjected, is induced in the winding by variation in magnetic flux occasioned by the displacement with respect to the seismometer casing of a steady mass 14, yieldably suspended in the casing. The details of the seismometer form no part of the present invention. If a magnetic seismometer be employed, the construction may be that shown in the patent to Petty 2,348,225, granted May 9, 1944. If a capacitative seismometer is employed, it may be constructed as suggested in the patent to Petty 2,357,356, granted September 5, 1944. Regardless of the type of seismometer employed, it may be provided with an output circuit and associated leads for connection to a conducting line or cable, whereby the electrical output of the seismometer may be transmitted to the amplifying and recording station.

Thus the leads 20 and 21 of the seismometers 10 of the first group are connected to the conductors 16, 17 of a transmission line, and the leads 22 and 23 of the seismometers 11 of the second group are connected to conductors 18 and 19 of a second transmission line. Separate amplifying and recording devices, located at the recording station, are energized from each of the conducting lines of the system.

It is common practice to combine the output of several seismometers of a group, for example to minimize stray energy as explained more fully in the patent to Welty 2,291,779, granted August 4, 1942, and the invention is illustrated with reference to such a system. It will nevertheless be appreciated that the advantages of the invention may be realized in any other arrangement of seismometers, for instance in a system in which the output of each seismometer is separately amplified and recorded, only one seismometer being connected to each conducting or transmission line. Other variations may be effected in the circuit thus far described, which is conventional, and the details thereof form no part of the present invention.

A source of low D. C. potential 13 is associated with the output circuit of each seismometer, preferably being arranged in a series with the inductive winding 12. A like source of potential 15 is associated with the input circuit at the recording station, for instance in series with the primary winding of the input transformer 25, this second source of voltage being so connected as to oppose the voltage developed by the source or sources 13 associated with the seismometers. Thus during the normal operation of the system, these voltage sources exert no effect on the record.

Each of the conducting lines 16, 17 and 18, 19 is connected to the associated input circuit through a switch 24, each switch being operable at the recording station to connect its conducting line to the terminals of a polarity indicating device, such as the milliammeter 30. Thus by the selective operation of the several switches 24, the operator at the recording station may connect in succession each of the several conducting lines to the indicating instrument and thereby determine whether the several seismometers have been properly connected to the associated conducting lines.

It will be appreciated that the system illustrated in the drawings may be extended to enable the operator to check the connections between a seismometer or group of seismometers to any number of conducting lines, it being necessary only to supply additional switch points for connecting the additional lines to the indicating instrument. Broadly speaking, the invention contemplates the use, in combination with the individual detectors, of any equivalent polarizing device whereby the characteristics of the circuit are so altered in the event of faulty or improper connection of the seismometer to the conducting line, as to give an indication of the fault at the recording station.

Having thus described the invention, what is climed as new and desired to be secured by Letters Patent is:

1. In apparatus for use in seismic surveying the combination with at least one seismometer, of amplifying and recording devices at a remote station, a conducting line connecting said seismometer with said devices, a source of low D. C. potential in the output circuit of the seismometer, of a second source of low D. C. potential at said station connected with said devices so as to oppose said first named source during the amplification and recording of signal energy, a polarity indicating device at said station responsive to said first named source, and means at said station for connecting to said conducting line either said amplifying and recording devices and said opposing source, whereby signal energy may be amplified and recorded, or said polarity indicating device, whereby improper connection of said seismometer with said conducting line may be determined at said remote station.

2. In apparatus for use in seismic surveying the combination with at least one seismometer, of amplifying and recording devices at a remote station, a conducting line connecting said seismometer with said devices, a source of low D. C. potential in series in the output circuit of the seismometer, of a second source of low D. C. potential at said station connected in series with said devices so as to oppose said first named source during the amplification and recording of signal energy, a current responsive indicating device at said station, and a switch at said station for connecting to said conducting line either said amplifying and recording devices and said opposing source, whereby signal energy may be amplified and recorded, or said indicating device, whereby faulty connections between said seismometer and said conducting line may be determined at said remote station.

WILLIAM HARRY MAYNE.

REFERENCES CITED

The following references are of record in the file of this patent:

UNITED STATES PATENTS

| Number | Name | Date |
|---|---|---|
| 826,090 | Doran | July 17, 1906 |
| 2,052,057 | Reid | Aug. 25, 1936 |
| 2,423,970 | Gardner | July 15, 1947 |